United States Patent [19]
D'Angelo

[11] Patent Number: 5,806,738
[45] Date of Patent: Sep. 15, 1998

[54] VEHICLE HITCH SECURABLE CARRYING APPARATUS FOR GOLF BAGS AND THE LIKE

[76] Inventor: Mary D'Angelo, 46425 W. Main St., Northville, Mich. 48167

[21] Appl. No.: 866,338

[22] Filed: May 30, 1997

[51] Int. Cl.$^6$ ...................................................... B60R 9/08
[52] U.S. Cl. .......................... 224/521; 224/274; 224/525
[58] Field of Search .................................... 224/521, 520, 224/519, 274, 525, 526, 532, 917.5, 511, 512; 248/96; 280/DIG. 5, DIG. 6; D34/15; D12/16

[56] References Cited

U.S. PATENT DOCUMENTS

| | | | |
|---|---|---|---|
| 2,497,597 | 2/1950 | Gatewood | 224/526 |
| 4,533,013 | 8/1985 | Hightower | 224/274 X |
| 4,759,559 | 7/1988 | Moulton . | |
| 5,052,604 | 10/1991 | Tourangeau | 224/274 |
| 5,207,361 | 5/1993 | Slifka . | |
| 5,297,707 | 3/1994 | Weber . | |
| 5,372,287 | 12/1994 | Deguevara | 224/521 X |
| 5,400,933 | 3/1995 | Murray . | |
| 5,556,064 | 9/1996 | Cowe . | |
| 5,579,972 | 12/1996 | Despain | 224/521 X |

FOREIGN PATENT DOCUMENTS

| | | | |
|---|---|---|---|
| 200882 | 1/1939 | Switzerland | 224/917.5 |

*Primary Examiner*—Renee S. Luebke
*Attorney, Agent, or Firm*—Gifford, Krass, Groh, Sprinkle, Patmore, Anderson & Citkowski, P.C.

[57] ABSTRACT

A carrying apparatus for use with a vehicle having a rearwardly projecting hitch engaging portion and capable of supporting an elongate article such as a golf bag containing a plurality of golf clubs. A substantially horizontally disposed and planar shaped base supports a lower end of the elongate article and includes an upwardly projecting edge extending around a perimeter of the base. An elongate support is secured at a lower end to the base and extends upwardly therefrom so as to terminate at an upper end. A cross member is secured at a location proximate the upper end of the elongate support and includes a first laterally extending support portion and a second opposite and laterally extending support portion for engaging an upper end of the supported elongate article. A hitch receiving portion extends from the elongate support and includes an inserting end which is engaged by the vehicle hitch engaging portion so that the carrying apparatus is mounted in a suspended and rearwardly extending manner from the vehicle. A locking pin inserting through overlapping apertures formed in the hitch engaging portion and hitch receiving portion and preventing disengagement of the carrying apparatus from the hitch engaging portion.

8 Claims, 3 Drawing Sheets

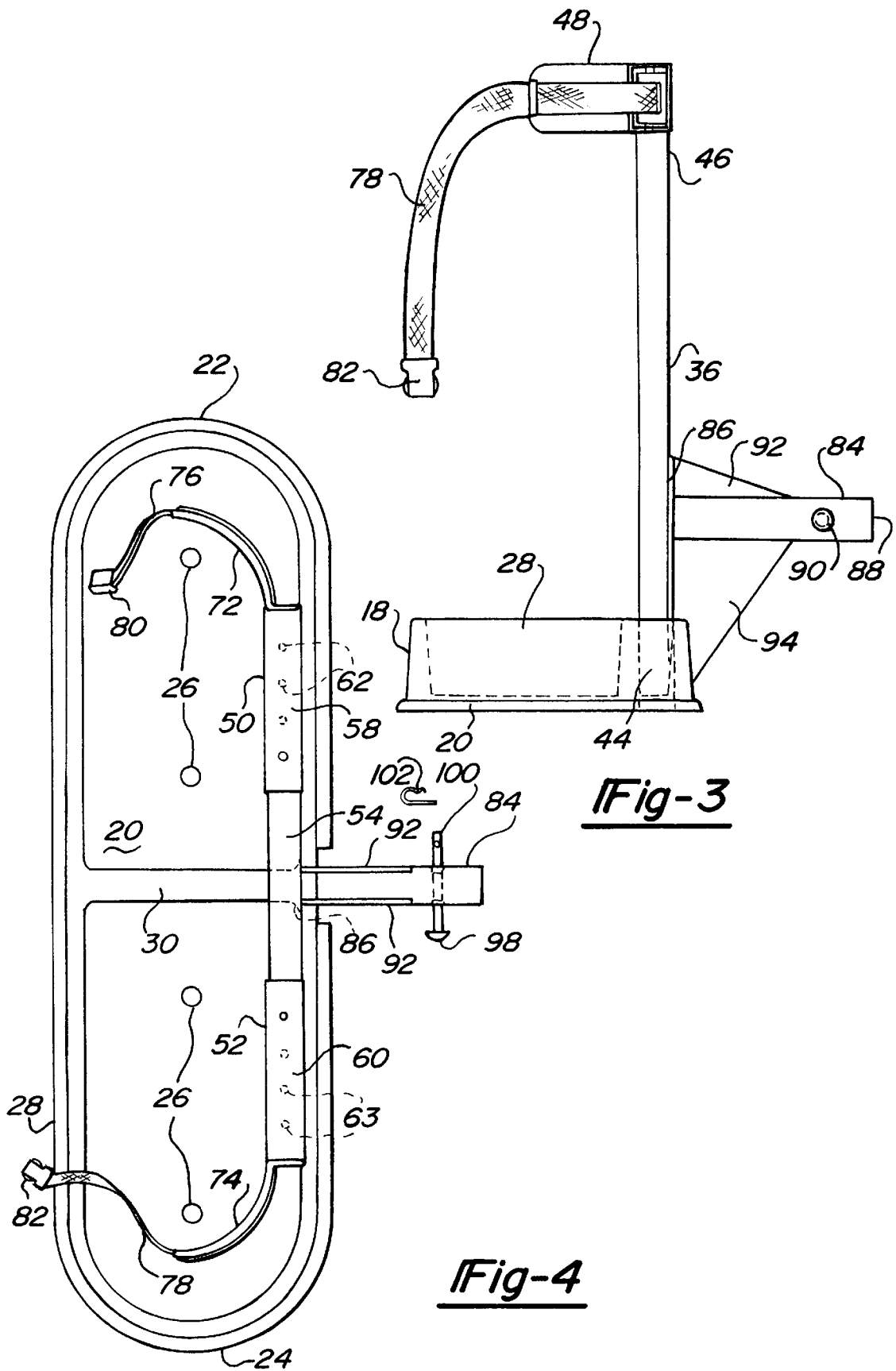

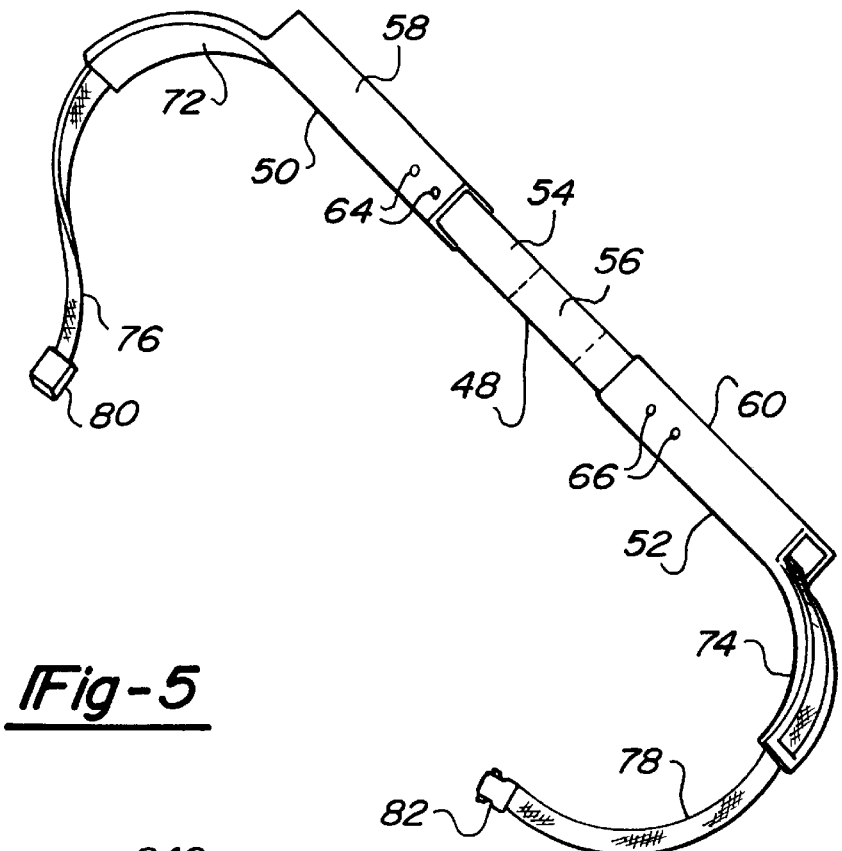
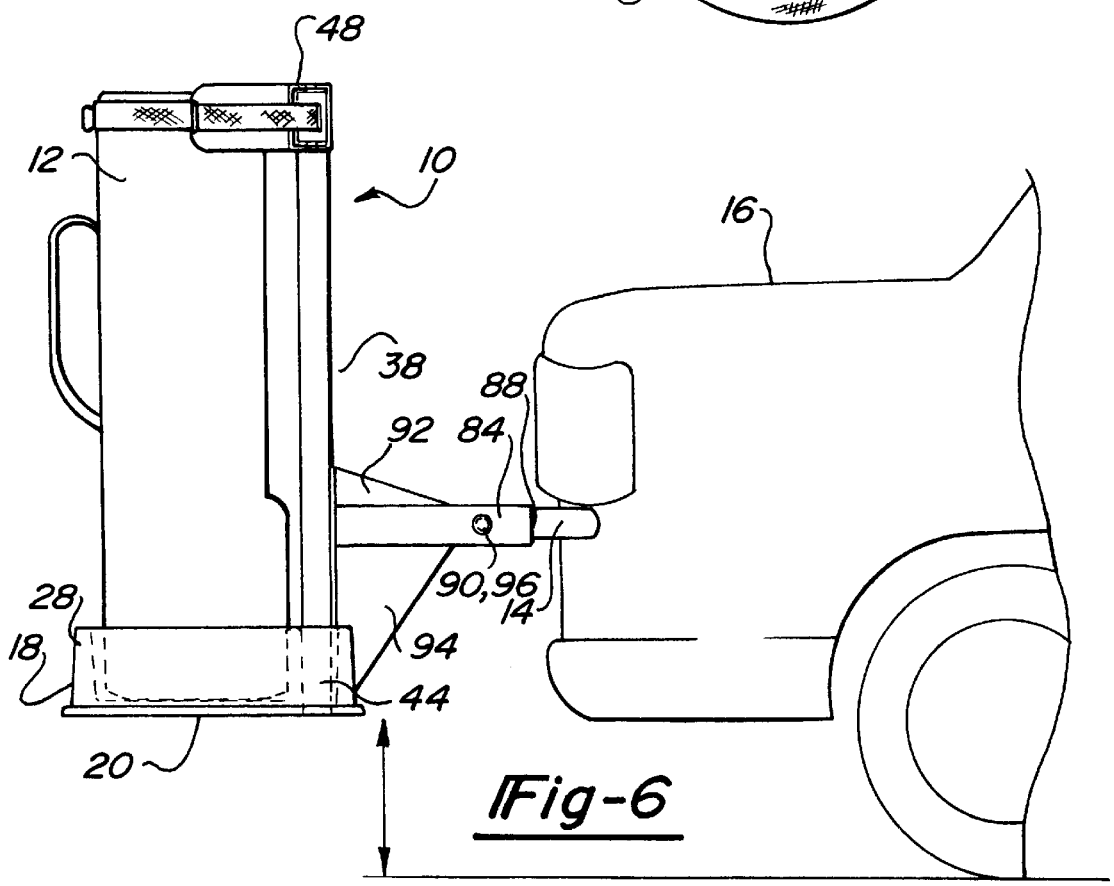

VEHICLE HITCH SECURABLE CARRYING APPARATUS FOR GOLF BAGS AND THE LIKE

BACKGROUND OF THE INVENTION

1. Field of the Invention

The present invention relates generally to article carrying apparatuses and, more particularly, to a vehicle hitch securable carrier apparatus for supporting golf bags and other articles in a rearwardly projecting and suspended manner relative to a vehicle and the vehicles hitch engaging portion.

2. Description of the Prior Art

Trailer hitch securable article carrying and support members are well known in the art. In a most common application, a vehicles hitch engaging portion is engaged by a trailer or other type device having a frame and other independent wheel and axis support. As is also known in the art, other types of hitch securable carrying apparatuses are known which are capable of being mounted to the vehicle hitch engaging portion in rearwardly extending and suspended fashion. The drawback of such known carrying apparatuses however is that they tend to be rather large and bulky and are not well suited for carrying elongate articles, such as one or more golf bags containing sets of golf clubs in a secure and easily demountable fashion.

It is often a desire of a golfer to have quick access to the golf bag and clubs which is not served by the devices set forth in the prior art. As is also often the case, many vehicles do not have adequate storage space and/or trunk space within which one or more elongated golf bags may be stored in a secure fashion.

An example of an existing golf bag carrier for a vehicle is illustrated in U.S. Pat. No. 5,400,933, issued to Murray, which teaches an upright cargo support including a pair of vertical supports which extend within a vehicle compartment and are bolted by feet portion to a bottom surface. A bar extends horizontally along an upper portion of the compartment and is releasably lockingly secured at opposite ends to the vertical supports. One or more golf bags or other elongated articles are supported in a suspended manner upon the horizontally extending bar.

The main drawback of the device of Murray is that it is suited only for use with a vehicle having a sizeable inner compartment, such as that which is provided by a van. The device of Murray is not applicable to drivers of passenger vehicles whom do not have the necessary interior room for suspending one or more golf bags or for storing them in a more conventional fashion within the vehicle trunk.

U.S. Pat. No. 5,556,064, issued to Cowe, discloses a golf bag and accessory cradle which consists of a pair of spaced apart and upwardly facing brackets which are attached to vertical supports which extend downwardly and which are telescopingly engaged within a common base. The base includes horizontal transverse extensions which provide stability to the device so that it may be placed within a standard vehicle trunk compartment. The device of Cowe is therefore directed to a supporting device for arranging a golf bag in a substantially horizontal and upwardly displaced fashion from a floor of the trunk compartment.

SUMMARY OF THE PRESENT INVENTION

The present invention is a carrying apparatus for use with a vehicle for supporting an elongate article, the vehicle having a rearwardly projecting hitch engaging portion. A substantially horizontally disposed and planar shaped base includes an upwardly projecting edge extending around a perimeter of the base and supports a lower end of the elongate article. An elongate support secures at a lower end to the planar shaped base and extends upwardly so as to terminate at an upper end. A cross member is secured at a location proximate the upper end of the elongated support and includes a first laterally extending support portion and a second opposite and laterally extending support portion. The support portions define in combination an engaging support of an associated upper end of the elongate article which is positionally supported at its lower end upon the planar shaped base.

A hitch receiving portion extends from a selected point along said elongate support and including an inserting end which is received by the rearwardly projecting hitch engaging portion of the vehicle so that the carrying apparatus is mounted in a suspended and rearwardly extending manner from the vehicle. The hitch receiving portion of the carrying apparatus is preferably constructed of a tubular, preferably rectangular cross sectional shape, elongate member which is dimensioned to be engaged by a conventionally associated and rearwardly projecting engaging portion of the vehicle. In a preferred embodiment, pairs of overlapping apertures are provided in the hitch engaging and receiving portions which, upon telescoping insertion and alignment, receive an inserting locking pin to prevent the hitch receiving portion from being disengaged from the hitch engaging portion.

According to a preferred embodiment, the first and second laterally extending support portions which make up the cross member have outwardly curved ends and are further provided with first and second straps which extend from their associated outwardly curved ends. The straps are capable of encircling the elongate article, such as is provided by one or more vertically supported golf bags, and the straps include engaging and receiving members at their ends which are snappingly engaged to secure the bags. The planar shaped base may further be specifically configured for vertically supporting the lower ends of a pair of golf bags.

BRIEF DESCRIPTION OF THE DRAWINGS

Reference will now be made to the attached drawings, when read in combination with the following specification, wherein like reference numerals refer to like parts throughout the several views, and in which:

FIG. 3 is a side view of the carrying apparatus according to the present invention and illustrating the cross member with laterally extending portions and engaging straps;

FIG. 4 is a top view of the carrying apparatus according to the present invention;

FIG. 5 is a sectional view of the cross member which further illustrates the outwardly curved ends and engaging straps which extend from the laterally extending support portions and the engaging and receiving members for securing the straps in encircling fashion around the elongate articles; and FIG. 6 an operative side view of a golf bag supported by the carrying apparatus according to the present invention is suspended and rearwardly spaced fashion from the rear of a vehicle.

DESCRIPTION OF THE PREFERRED EMBODIMENTS

Figure 1:
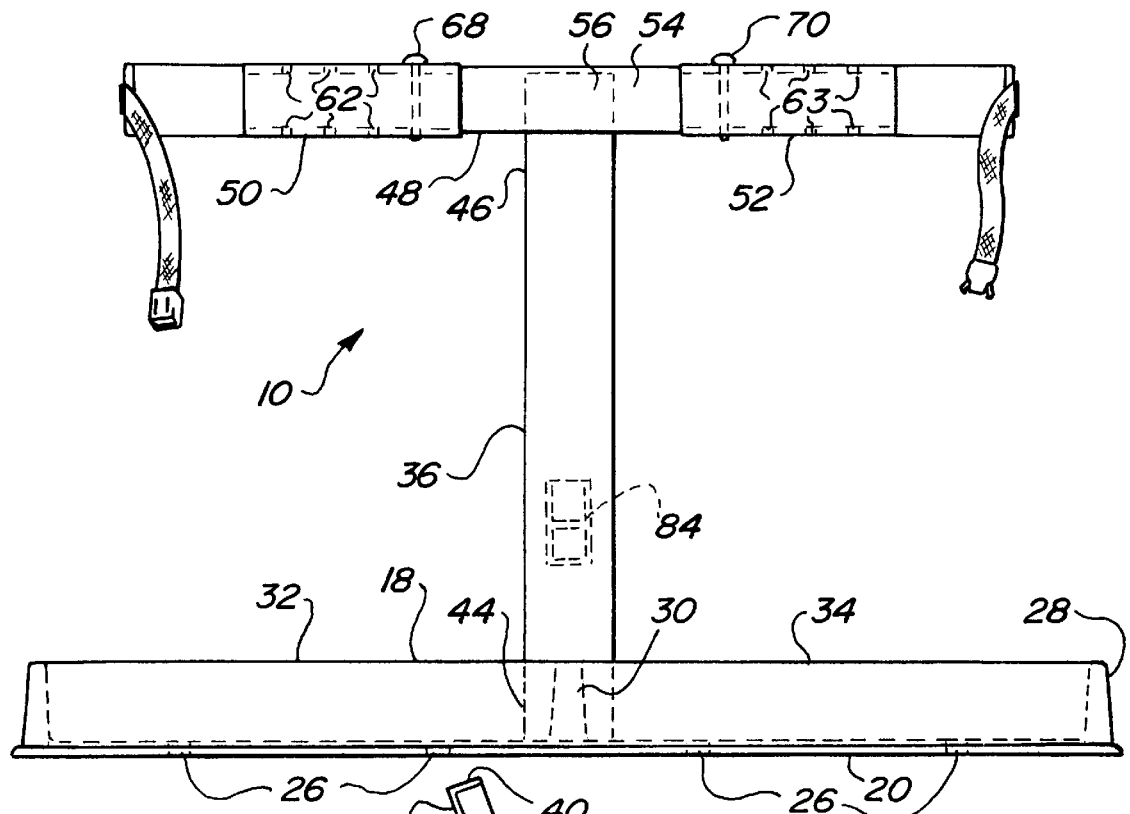
FIG. 1 is a front view of the carrying apparatus for use with a vehicle according to the present invention.

With reference to FIG. 1, a carrying apparatus 10 is illustrated according to a preferred embodiment of the present invention. As is further best shown in the operative view of FIG. 6, the carrying apparatus 10 is capable of supporting an elongated article 12, such as a golf bag, in a suspended and extending fashion from a rearwardly projecting hitch engaging portion 14 of a vehicle. 16. The hitch engaging portion 14 may be of a type which is commercially available and is tubular shaped in cross section with a rearwardly projecting end.

Figure 2:
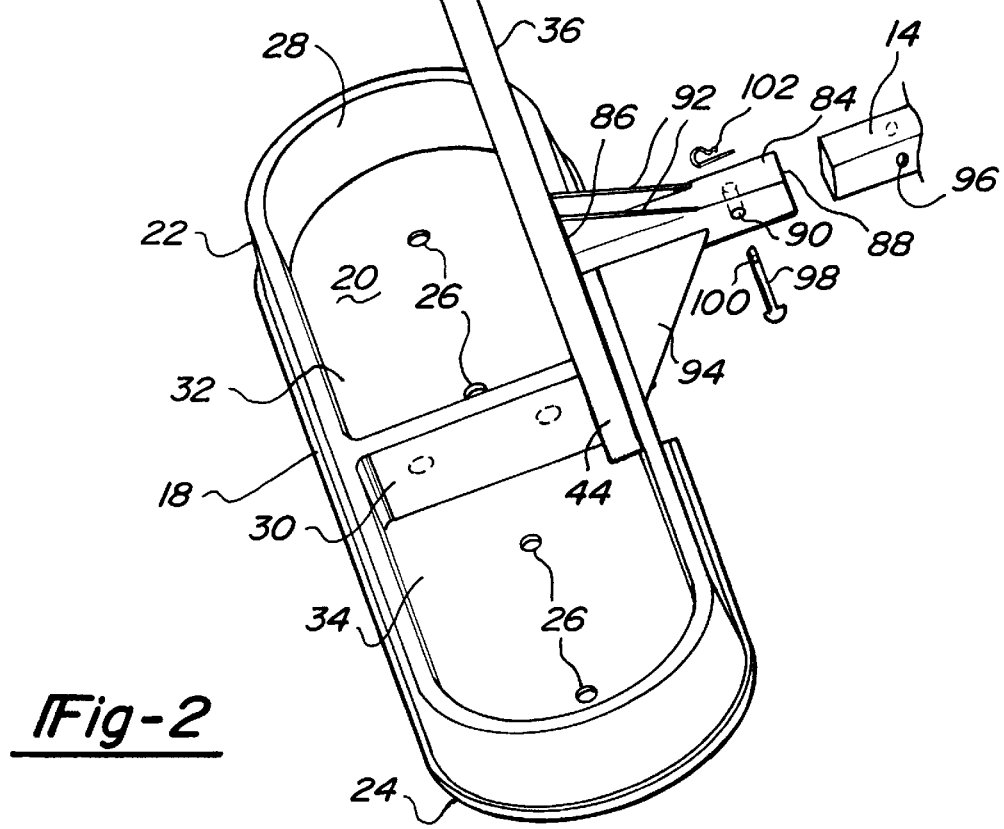
FIG. 2 is a perspective view in partial section of the planar shaped base, elongate support and hitch receiving portions of the carrying apparatus according to the present invention.

Referring again to FIG. 1, and also to FIGS. 2–4, the carrying apparatus 10 includes a base 18 which, as is best shown in FIG. 2, includes a floor 20 with first and second rounded edges 22 and 24. Drainage holes 26 are formed in the floor 20 at spaced apart intervals and a perimeter of the base 18 includes an upwardly projecting edge 28 which defines an interior of the base 18. In a further preferred embodiment, an additional projecting edge 30 extends along a midpoint of the base 18 from a forward edge to a rearward edge and sections the base into a first supporting half 32 and a second supporting half 34. The base 18 may be constructed of any durable and load carrying material, but is preferably a high grade steel composition, lightweight steel alloy or other durable polymer/plastic material.

An elongate support 36 is provided and is preferably constructed of a member having a U-shaped cross sectional shape or other shape capable of sustaining loading forces in more than one direction. The elongate support 36 includes in cross section a base 38 and first and second sides 40 and 42 which establish a substantially "U" shape in cross section. The elongate support 36 secures, at a lower end 44, to the base 18. As is viewed from FIG. 3 of the illustrations, a portion of a length of the axially extending base 38 at the lower end 44 of the elongate support 36 is removed to permit the first and second sides 40 and 42 at the lower end 44 to be slidingly and matingly engaged over opposing sides of the additional projecting edge 30. The lower end 44 of the elongate support 36 may then be fixedly secured to the base such as by welding over the interengaging edges to provide a secure connection. The elongate support terminates in upwardly extending fashion at a corresponding upper end 46.

Referring again to FIGS. 1 and 3–5, a cross member 48 is provided and is secured at a location proximate the upper end 46 of the elongate support 36. As is best shown in the sectional perspective of FIG. 5, the cross member 48 includes a first laterally extending support portion 50 and a second opposite and laterally extending support portion 52. The first and second laterally extending support portions 50 and 52 are telescopingly engaged with a central tubular member 54 of the cross member 48 and an underside receiving aperture 56 of the central member 54 is illustrated in phantom for securing the cross member 48 to the upper end 46 of the elongate support 36, again by welding or other means known in the art.

The first and second laterally extending support portions 50 and 52 further include outer and hollow tubular shaped members 58 and 60, respectively, which slidably and telescopingly engage over opposing ends of the central tubular member 54. The central tubular member 54 and first and second outer tubular members 58 and 60 provide matingly interengaging surfaces which permit the outer members 58 and 60 a range of telescoping inward and outward repositioning. As is best illustrated in the frontal view of FIG. 1, the central tubular member 54 likewise includes a hollow interior elongate member and further includes pairs of spaced apart and aligned apertures 62 and 63 formed in upper and lower surfaces of the hollow elongate member 54 and along axially extending and predetermined ranges associated with the extending sides of the member 54. Referring again to FIG. 5, the first and second outer tubular members 58 and 60 are provided with first and second pairs of aligning apertures 64 and 66, respectively, which are formed through opposite faces of the members 58 and 60 and are communicable through their hollow interiors. As is again illustrated in FIG. 1, first and second pins 68 and 70 are associatingly inserted through the aligning pairs of apertures 64 and 66 and selected pairs of apertures 62 and 63 to allow for repositioning of the outer tubular members 58 and 60 at selected axial distances relative to the central tubular member 54. The pins 68 and 70 are designed so that they may be easily withdrawn or retracted and the outer tubular members 58 and 60 repositioned as desired.

The first outer tubular member 58 terminates in a first outwardly curved end 72 and the second outer tubular member 60 likewise terminates in a second opposite and outwardly curved end 74. The first and second outwardly curved ends 72 and 74 are preferably integrally formed with their associated tubular members 58 and 60 and in combination provide the laterally extending support portions. According to a preferred embodiment, the outwardly curved ends of the support portions are constructed so that they may be biasingly engaged by associated upper ends of an elongate article to be supported and are capable of bearing a specified load resistance resulting from carrying of such articles.

In a preferred embodiment, a first elongate strap 76 extends from the first outwardly curved end 72 of the first tubular member 58 and a second elongate strap 78 extends from the second outwardly curved end 74 of the second tubular member 60. The first and second straps 76 and 78 are capable of encircling the associated upper end of the elongate article 12 (see FIG. 6) and additional interengaging means in the form of a first receiving member 80 attached to a free end of strap 76 and a second engaging/locking member 82 with interengaging tabs are attached to a corresponding free end of strap 78 are provided for releasably securing the straps in place. While straps 76 and 78 are disclosed according to the illustrated preferred embodiment, it is also understood that other types of securing means, such as may be provided by bungee cords or the like (not shown) may alternatively be employed to releasably secure the golf bag/elongate article within the scope of the present invention.

Referring again to FIGS. 2, 3 and 4, a hitch receiving portion 84 is secured to and extends in a horizontal fashion from a selected point 86 along the vertically extending elongate support 36. The hitch receiving portion 84 is substantially tubular shaped in section and includes an inserting end 88 and a laterally extending aperture 90. A gusset plate construction provides reinforcing support of the carrying apparatus 10 to the projecting hitch receiving portion 84 and includes a pair of upper triangular shaped gusset plates 92 and a pair of lower triangular shaped gusset plates 94 (see particularly FIG. 2) which extend along perpendicularly facing surfaces of the upwardly and downwardly extending elongate support 36 relative to the rearwardly extending hitch receiving portion 84. It is also envisioned that other types of reinforcing support may be used in place of the gusset plates or that a heavy duty connection between the tubular support 36 and receiving portion 84 is accomplished by addition welding or the like.

Referring again to the partially exploded view of FIG. 2 and the operative environmental view of FIG. 6, the rearwardly projecting hitch engaging portion 14 of the vehicle is dimensioned in the preferred embodiment so that it may be axially and slidably engaged with the hitch receiving portion 84 in either an outer or inner telescoping fashion so that a pair of aligned apertures 96 formed in opposing surfaces of the engaging portion 14 are aligned with the laterally extending aperture 90 of the receiving portion 84. In the embodiment illustrated, the interior of the hitch receiving portion 84 is hollowed so that the hitch engaging portion 14 is inserted therein a desired longitudinal distance and which, prior to lockingly engaging the carrying apparatus in place, will transfer the cantilever forces exerted by the carrying apparatus to the hitch engaging portion 14. It is also envisioned that the hitch engaging portion 14 of the vehicle may either be of a type which is commercially known in the art or, if not available, may be customized according to the specifications of the hitch receiving portion 84 and installed to the frame of the vehicle 16 as part of a kit.

Finally, a pin or appropriate mounting bolt 98 (FIG. 2) is capable of being inserted through the aligning apertures 90 and 96 (FIG. 6) and includes an aperture 100 formed through a remote end of its shaft for receiving a locking clip 102. While not shown in the illustrations, it is also envisioned that a chain or other type of backup engaging member may be secured so as to extend between the hitch receiving portion 84 and hitch engaging portion 14 to provide additional or backup locking support in the event of failure of the pin 98.

As is again shown in FIG. 6, the carrying apparatus is illustrated according to an operative view for supporting a golf bag 12 at upper and lower ends in a rearwardly projecting and suspended fashion from the vehicle 16. It is envisioned according to the present invention that at least a pair of first and second golf bags may be supported in side by side fashion and this is facilitated by the separated first and second supporting halves 32 and 34 of the base. It is also envisioned that other and additional types of elongate members may be quickly and easily secured and demounted from the carrying apparatus according to the present invention.

Having described my invention, additional embodiments will become apparent to those skilled in the art to which it pertains without deviating from the scope of the appended claims.

I claim:

1. A carrying apparatus for use with a vehicle having a rearwardly projecting hitch engaging portion, said carrying apparatus capable of supporting an elongate article and comprising:

a substantially horizontally disposed and planar shaped base upon which a lower end of the elongate article is adapted to be supported, said base including an upwardly projecting edge extending around a perimeter of said base;

an elongate support securing at a lower end to said base and extending upwardly therefrom so as to terminate at an upper end;

a cross member secured at a location proximate said upper end of said elongate support and including a first laterally extending support portion and a second opposite and laterally extending support portion, a corresponding upper end of the supported elongate article being adapted to be engaged by said first and second laterally extending support portions;

said cross member further including a central hollow and elongate shaped member having a first extending end and a second extending end, said first and second laterally extending support portions further including first and second outer tubular shaped members which telescopingly engage over said first and second extending ends of said central member, respectively, first and second outwardly curved ends extending from said first and second outer tubular shaped members; and a hitch receiving portion extending from said elongate support, the hitch engaging portion of the vehicle being adapted to engage an inserting end of said hitch receiving portion so that said carrying apparatus is mounted in a suspended and rearwardly extending manner from the vehicle and said hitch receiving portion is prevented from being disengaged from the hitch engaging portion.

2. The carrying apparatus for use with a vehicle according to claim 1, further comprising a first strap extending from said first laterally extending support portion and a second strap extending from said second laterally extending support portion, said first strap including a first engaging member secured to an end thereto and said second strap likewise including a second engaging member likewise mounted thereto for being engaged by said first member.

3. The carrying apparatus for use with a vehicle according to claim 1, further comprising means for axially repositioning said first and second outer tubular shaped members in both inwardly and outwardly extending fashion relative to said central member.

4. The carrying apparatus for use with a vehicle according to claim 3, said axially repositioning means further comprising a first plurality of spaced apart pairs of receiving apertures extending along said first extending end of said central member and a second plurality of spaced apart pairs of receiving apertures extending along said second extending end, a first pair of outer apertures formed in said first outer tubular shaped member and a second pair of outer apertures formed in said second outer tubular shaped member, said outer pairs of apertures being aligned with selected pairs of said plurality of first and second receiving apertures.

5. The carrying apparatus for use with a vehicle according to claim 1, said planar shaped base including a floor with a first rounded edge and a second rounded edge, an additional upwardly projecting edge extending between forward and rearward edges of said base and dividing an area of said base into a first half and a second half.

6. The carrying apparatus for use with a vehicle according to claim 5, further comprising a plurality of drain holes formed in said base.

7. The carrying apparatus for use with a vehicle according to claim 1, said hitch receiving portion including a first pair of spaced apart and aligning apertures, the hitch engaging portion of the vehicle capable of being telescopingly engaged with said hitch receiving portion and including a second pair of spaced apart and aligning apertures which are positionally aligned with said first pair of apertures, a locking pin inserting through said pairs of aligned apertures and a clip engaging a projecting end of a pin shaft to prevent withdrawal of said pin.

8. The carrying apparatus for use with a vehicle according to claim 7, further comprising a first pair of gusset plates extending from an upper surface of said hitch receiving portion and engaging an upper portion of said elongate support, a second pair of gusset plates extending from a corresponding lower surface of said hitch receiving portion and engaging a lower portion of said elongate support.

* * * * *